United States Patent

Warner

[15] 3,657,074

[45] Apr. 18, 1972

[54] PURIFICATION OF PYRUVALDEHYDE

[72] Inventor: John S. Warner, Columbus, Ohio

[73] Assignee: Wm. Wrigley, Jr. Company, Chicago, Ill.

[22] Filed: Mar. 21, 1968

[21] Appl. No.: 714,807

[52] U.S. Cl. ................................203/52, 203/67, 203/91, 203/100, 260/593 P
[51] Int. Cl. ........................................................B01d 3/34
[58] Field of Search ....................................260/593 P, 593

[56] References Cited

UNITED STATES PATENTS 2,866,823  12/1958  Guest et al. ..........................260/593
3,419,477  12/1968  Mattia ...............................260/593 P

FOREIGN PATENTS OR APPLICATIONS 505,559  5/1939  Great Britain ..........................260/593
666,435  6/1949  Great Britain ..........................260/593

Primary Examiner—Bernard Helfin
Assistant Examiner—W. B. Lone
Attorney—Le Blanc & Shur

[57] ABSTRACT

A process for the purification of pyruvaldehyde which comprises the gradual addition of a crude aqueous solution of pyruvaldehyde, containing amounts of color bodies, and polymeric products to a water-immiscible liquid maintained at a temperature of about 80° C. to about 200° C. at atmospheric or reduced pressure, and preferably of an inert atmosphere, and collecting the pyruvaldehyde. The purified pyruvaldehyde is recovered as the aqueous phase from a condensed azeotype. Suitable water-immiscible liquids include mineral oil, petroleum solvents, tetrachloroethane, ortho-dichlorobenzene, and other high-boiling hydrocarbons and halohydrocarbons.

10 Claims, No Drawings

3,657,074

PURIFICATION OF PYRUVALDEHYDE

BACKGROUND OF THE INVENTION

1. Field of the Invention

This invention relates to a process for the purification of aqueous solutions of pyruvaldehyde which contain considerable amounts of color bodies and polymeric products.

2. Description of the Prior Art

Pyruvaldehyde is a known material useful as an intermediate in the production of many chemical compounds and also useful per se because of its anti-virus activity. For example, it is known to be useful as an intermediate in the synthesis of particularly potent insecticides of the allethrin type. In one of the steps in the synthesis of the alcohol portion of the allethrin molecule, pyruvaldehyde may be reacted with the beta-keto ester, ethyl 3-keto-6-heptenoate to form 3-hydroxy-8-nonene-2,5-dione. Similarly, in the synthesis of the alcohol portion of the cyclethrin molecule, pyruvaldehyde is reacted with the beta-keto ester, ethyl-4-2(cyclopentenyl)-3-ketobutyrate to form 6-(2-cyclopentenyl)-3-hydroxy-2,5-hexanedione. In more recent years, this material has become even more valuable in a varied number of chemical synthesis and is also being used to some extent in food chemistry. In these syntheses, as well as for the other areas of use, it is important that the pyruvaldehyde be provided in as pure a form as possible. Accordingly, it is particularly important to find suitable procedures to provide this material in a pure form.

The prior art is cognizant of many attempts to prepare pyruvaldehyde without the excessive formation of impurities by reason of side reactions. However, none of these prior attempts have been successful in obtaining the pyruvaldehyde in a sufficiently pure form as the material produced commercially often contains large amounts of colored impurities, polymeric products and formaldehyde which must be removed prior to use. Consequently, it is recognized in the art that additional purification of pyruvaldehyde is necessary to place the material in a purified form for use in the above areas.

One process by which pyruvaldehyde may now be purified is that disclosed in U.S. Pat. No. 2,866,823 to Guest and Kiff (1958) which comprises heating an aqueous solution of the pyruvaldehyde and formaldehyde with methanol and an acid catalyst at about 65° C. to form dimethyl formal and dimethyl acetal of pyruvaldehyde, distilling off an azeotrope of the dimethyl formal and methanol and then hydrolyzing the formaldehyde-free pyruvaldehyde acetal back to the free pyruvaldehyde. While this procedure has been successful in substantially reducing the formaldehyde content in the pyruvaldehyde solution, it has not been successful in removing the colored bodies and small amounts of polymeric materials contained therein.

It is, therefore, clear that a distinct need remains in the art for a commercially attractive process for the purification of pyruvaldehyde to produce substantially clear, impurity-free aqueous solutions thereof. The process of this invention, when used in conjunction with a method such as that of Guest and Kiff, affords an aqueous solution of pyruvaldehyde that is substantially clear and impurity free.

SUMMARY OF THE INVENTION

It is accordingly one object of the present invention to provide a process for the purification of pyruvaldehyde which overcomes or otherwise mitigates the problems of the prior art.

A further object of the invention is to provide a process for the purification of aqueous solutions of pyruvaldehyde to substantially remove the color bodies and polymeric materials therefrom.

A still further object of the invention is to provide an economic and commercially attractive process for the purification of aqueous solutions of pyruvaldehyde by rapid distillation thereof under conditions which cause the rapid dissociation of pyruvaldehyde hydrate and immediate vaporization of the water and pyruvaldehyde.

Other objects and advantages of the present invention will become apparent as the description thereof proceeds.

In satisfaction of the foregoing objects and advantages, there is provided by this invention a process for the purification of pyruvaldehyde by substantial removal of the color bodies and polymeric materials contained in aqueous solutions thereof which comprises the gradual addition of and aqueous solution containing the crude pyruvaldehyde to a water-immiscible liquid maintained at a temperature of about 80° C. to about 200° C. at atmospheric or reduced pressure and preferably in an inert atmosphere and recovering the purified pyruvaldehyde as the aqueous phase from a condensed azeotrope.

DESCRIPTION OF THE PREFERRED EMBODIMENTS

In accordance with the novel aspects of the present invention, it has been discovered that aqueous solutions of crude formaldehyde-free pyruvaldehyde may be purified to remove substantially all the color bodies and polymeric materials therefrom. The process in its broadest aspects is carried out by the gradual addition of an aqueous solution of the crude pyruvaldehyde to a water-immiscible liquid, maintained at a temperature of about 80° C. to about 200° C. at atmospheric or reduced pressure and preferably in an inert atmosphere. The purified pyruvaldehyde is obtained as an aqueous distillate or as the aqueous phase from a condensed azeotrope and is nearly colorless. It is thus to be appreciated that the process of the invention permits the production of good quality pyruvaldehyde solutions by a simple and commercially feasible procedure.

It is theorized that the purification occurs by distillation under the described conditions whereby rapid disassociation of pyruvaldehyde hydrate and its polymers occurs and is immediately vaporized as water and free pyruvaldehyde while retaining the nonvolatile impurities in the reactor. Recovery of the product is as described herein. While it is believed that this is the manner by which the purification is effected, it is to be understood that the invention is not to be limited thereto.

The process is particularly applicable for purifying the dark, almost tarry, pyruvaldehyde solutions obtained, for example, by the formaldehyde-removal process of Guest and Kiff described in U.S. Pat. No. 2,866,823 discussed above. The present process is very suitable for the solutions obtained by the process of this prior patent as the present process does not appear to effect a great reduction in formaldehyde content in operating, for example, with commercial pyruvaldehyde, as only a slight reduction in formaldehyde content is apparently achieved thereby. However, the process serves admirably for substantially complete removal of colored materials and polymeric products contained in such pyruvaldehyde solutions.

The process is operable for use with aqueous solutions containing about 10 to about 50 percent of pyruvaldehyde and preferably having about a 30 to 50 percent pyruvaldehyde content.

In conducting the process of this invention, an aqueous solution such as that described above is added gradually to a water-immiscible liquid maintained at a temperature of about 80° to 200° C. A preferred temperature at which the water-immiscible liquid is maintained is about 120° to 160° C.

In a preferred embodiment of the invention, the crude pyruvaldehyde solution is added gradually to the surface of a water-immiscible organic liquid maintained at a temperature of 80° to about 200° C. at atmospheric or reduced pressure and preferably under an inert atmosphere. Water-immiscible organic liquids which may be employed generally include the hydrocarbons and halohydrocarbons. Specific materials which may be used in the embodiment include mineral oil, ortho-dichlorobenzene, 1,2,4-trichlorobenzene, bis-(2-chloroethyl) ether, 1,2,3-trichlorobenzene, 1,2,3-trichloropropane, petroleum solvents, such as those boiling in the distillation range of 180° to 200° C., naphthol spirits, tetrachloroethane and the like. The water-immiscible organic liquid may, of course, be any material equivalent to the above. Preferred materials falling within the above class of organic solvents are the petroleum solvents boiling at about 180° to 200° C. as the most satisfactory yields have been obtained thereby.

The reaction is usually conducted by utilization of the water-immiscible organic solvent in a volume equivalent to or in excess over the volume of crude pyruvaldehyde solution to be added. In operation, water-immiscible solvent is preferably placed in a reaction flask with vigorous stirring and heated to the required temperature of about 80° to 200° C. The flask is preferably equipped with a distillate receiver such as a Barrett type receiver to collect the aqueous distillate and permit the immiscible organic layer to return to the reaction flask. In a preferred embodiment for conducting the process, the organic liquid is maintained at about 150° to 160° C. under an inert gaseous atmosphere, such as nitrogen, argon, etc. and is vigorously agitated. The process may be operated under a reduced pressure or at atmospheric pressure, with the atmospheric pressure operation being preferred.

It is sometimes desirable to include materials such as anhydrous sodium sulfate and diatomaceous earth in the water-immiscible solvent contained in the reaction flask. These materials are included as an aid in keeping the tarry by-products in suspension in the flask and preventing their pyrolysis at the heated surface of the reactor.

When the crude pyruvaldehyde solution is added to the reaction flask containing the water-immiscible organic liquid, a distillate is immediately "flashed-off" or distilled therefrom and is easily condensed and recovered. Recovery may be by way of merely removing the distillate as it is "flashed-off" from an essentially nonvolatile immiscible liquid or by removal of the aqueous phase from an azeotrope that is the distillate from a volatile immiscible liquid. The dark impurities will be retained in the liquid in the flask. Recovery of the purified products results in yields of up to 95 percent of pale yellow pyruvaldehyde solutions.

The distillate obtained may be extracted with low boiling petroleum ether or equivalent material to remove any traces of the higher boiling organic immiscible liquid employed and then sparged with nitrogen to remove traces of any petroleum ether used to recover the purified product.

The following examples are presented to illustrate preferred embodiments of the invention but are not to be considered as limitative thereon.

EXAMPLE I

An 82.6 gram sample of a black viscous "formaldehyde-free" pyruvaldehyde solution, prepared according to the procedure of Guest and Kiff (U.S. Pat. No. 2,866,823) and containing 44 percent pyruvaldehyde, was added dropwise to 200 ml. of petroleum solvent (distillation range; 182°–199° C.) while vigorously stirring at a temperature of 170° to 180° C. A condenser and a Barrett-type receiver was employed to collect the aqueous distillate and permit the less dense organic layer to return to the distilling flask. The aqueous distillate was very fluid, pale yellow in color, and weighed 63.1 grams.

EXAMPLE II

A 200-gram sample of crude aqueous pyruvaldehyde, which was dark amber in color and contained 36.4 percent pyruvaldehyde and 0.37 percent formaldehyde, was added dropwise to a vigorously stirred mixture of 200 ml. of mineral oil, 20 grams of anhydrous sodium sulfate, and 20 grams of diatomaceous earth at 85° to 90° C. and at a pressure of about 1 mm. The aqueous distillate was collected at −78° C. and subsequently melted. There was obtained a pale yellowish-green liquid weighing 140.1 grams and containing 32.0 percent pyruvaldehyde and 0.30 percent formaldehyde.

EXAMPLE III

A 200-gram sample of crude aqueous pyruvaldehyde, which was dark amber in color and contained 41.7 percent pyruvaldehyde and 1.0 percent formaldehyde, was added dropwise to a vigorously stirred mixture of petroleum solvent (distillation range: 182° to 199° C.), 20 grams of anhydrous sodium sulfate, and 20 grams of diatomaceous earth at 150° to 160° C. under a nitrogen atmosphere. A condenser and a Barrett-type receiver was used to collect the aqueous distillate and permit the less dense organic layer to return to the distillation flask. The aqueous distillate was pale yellow in color, weighed 175.7 grams, and contained 44.1 percent pyruvaldehyde and 0.9 percent formaldehyde.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A process for the purification of pyruvaldehyde by removal of nonvolatile colored bodies and polymeric materials therefrom, contained in aqueous solutions thereof having up to about 1 percent formaldehyde, which comprises the gradual addition of said crude aqueous solution pyruvaldehyde to a water immiscible hydrocarbon or halohydrocarbon maintained at a temperature of about 80° to 200° C. to affect immediate vaporization of the pyruvaldehyde.

2. A process according to claim 1 wherein the aqueous solution of crude pyruvaldehyde contains pyruvaldehyde in a concentration of about 10 to 50 percent.

3. A process according to claim 1 wherein the purification is carried out at atmospheric or reduced pressure.

4. A process according to claim 1 wherein the water immiscible liquid is an organic liquid selected from the group consisting of mineral oil, petroleum solvents boiling above 100° C., ortho-dichlorobenzene, trichlorobenzene, trichloropropane, bis-(2-chlorethyl) ether, and tetrachloroethane.

5. A process according to claim 1 wherein the crude pyruvaldehyde solution is added gradually to a water immiscible liquid maintained at the temperature of about 120° to 160° C.

6. A process according to claim 1 wherein the purification is carried out at atmospheric pressure.

7. A process according to claim 1 wherein the purification is carried out under an inert atmosphere.

8. A process according to claim 7 wherein the inert atmosphere comprises nitrogen gas.

9. A process according to claim 1 wherein purified pyruvaldehyde is isolated as a distillate.

10. A process according to claim 1 wherein purified pyruvaldehyde is isolated as the aqueous phase from a condensed azeotrope.

* * * * *

UNITED STATES PATENT OFFICE
CERTIFICATE OF CORRECTION

Patent No. 3,657,074            Dated April 18, 1972

Inventor(s) John S. Warner

It is certified that error appears in the above-identified patent and that said Letters Patent are hereby corrected as shown below:

In the Abstract, line 8, "azeotype" should read --azeotrope--.

In Column 2, line 7, "and" ahould read --an--.

Signed and sealed this 5th day of September 1972.

(SEAL)
Attest:

EDWARD M. FLETCHER, JR.                ROBERT GOTTSCHALK
Attesting Officer                       Commissioner of Patents